United States Patent
Mathews et al.

(10) Patent No.: US 7,607,415 B2
(45) Date of Patent: Oct. 27, 2009

(54) METHOD OF CRANK SIGNAL DISTURBANCE COMPENSATION

(75) Inventors: David S. Mathews, Howell, MI (US);
Tameem K. Assaf, Milford, MI (US);
Ronald J. Kubani, Highland, MI (US);
David L. St. Pierre, Mason, MI (US);
Yong Xu, Ann Arbor, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 305 days.

(21) Appl. No.: 11/542,672

(22) Filed: Oct. 3, 2006

(65) Prior Publication Data
US 2008/0078361 A1    Apr. 3, 2008

(51) Int. Cl.
*F02P 5/00*       (2006.01)
*F02D 31/00*   (2006.01)
*G06F 19/00*   (2006.01)
*G06G 7/76*     (2006.01)

(52) U.S. Cl. ............... 123/406.18; 123/352; 701/114

(58) Field of Classification Search ............ 73/114.04, 73/114.05, 114.24, 114.26; 123/435, 436, 123/406.25, 496.24; 701/110, 111, 114; 702/189, 190
See application file for complete search history.

(56) References Cited

U.S. PATENT DOCUMENTS

| | | | | |
|---|---|---|---|---|
| 4,664,082 A * | 5/1987 | Suzuki | .................. | 123/406.18 |
| 5,699,253 A * | 12/1997 | Puskorius et al. | ........... | 701/111 |
| 6,208,131 B1 * | 3/2001 | Cebis et al. | .................. | 324/165 |
| 6,363,318 B1 * | 3/2002 | Wang et al. | .................. | 701/110 |
| 6,530,360 B1 * | 3/2003 | Kondo | .................... | 123/406.27 |
| 6,799,556 B1 * | 10/2004 | Makino et al. | .......... | 123/406.24 |
| 6,990,405 B2 * | 1/2006 | Nakamura | .................... | 701/114 |
| 7,047,125 B1 * | 5/2006 | He et al. | ...................... | 701/110 |
| 7,136,739 B2 * | 11/2006 | Miyata et al. | ............... | 701/104 |
| 7,177,759 B2 * | 2/2007 | Nakamura | .................... | 701/114 |
| 7,188,020 B2 * | 3/2007 | Yasui et al. | .................. | 701/103 |
| 7,403,849 B1 * | 7/2008 | Watanabe et al. | ........... | 701/102 |
| 2003/0163247 A1 * | 8/2003 | Kobayashi et al. | .......... | 701/114 |
| 2004/0206333 A1 * | 10/2004 | Makino et al. | ......... | 123/406.59 |

* cited by examiner

*Primary Examiner*—Stephen K Cronin
*Assistant Examiner*—Sizo B Vilakazi

(57) ABSTRACT

An engine system that compensates for disturbances in a crankshaft signal is provided. The system includes: an error module that computes an error between an ideal period and an actual period of a crankshaft signal; a correction factor module that determines a correction factor based on the error; and a compensation module that applies the correction factor to the actual period of the crankshaft signal.

15 Claims, 5 Drawing Sheets

METHOD OF CRANK SIGNAL DISTURBANCE COMPENSATION

FIELD

The present disclosure relates to engine systems and more particularly to methods and systems for compensating for disturbances in a crankshaft signal.

BACKGROUND

The statements in this section merely provide background information related to the present disclosure and may not constitute prior art.

Vehicles include an internal combustion engine that generates drive torque. More specifically, the engine draws in air and mixes the air with fuel to form a combustion mixture. The combustion mixture is compressed and ignited to drive pistons that are disposed within the cylinders. The pistons rotatably drive a crankshaft that transfers drive torque to a transmission and wheels.

A crankshaft signal is generated based on the rotation of the crankshaft. A control module determines an engine position and an engine speed from the crankshaft signal. Engine position and engine speed are used to control one or more subsystems within the vehicle. Disturbances in the crankshaft signal can cause inaccurate engine speed and engine position computations and therefore may cause one or more vehicle subsystems to operate inefficiently.

SUMMARY

Accordingly, an engine system that compensates for disturbances in a crankshaft signal is provided. The system includes: an error module that computes an error between an ideal period and an actual period of a crankshaft signal; a correction factor module that determines a correction factor based on the error; and a compensation module that applies the correction factor to the actual period of the crankshaft signal.

In other features, a method of compensating for disturbances in a crankshaft signal is provided. The method includes: determining an actual period, an angular velocity, and an angular acceleration for K reference periods from a crankshaft position signal; computing an ideal period of rotation based on the actual period, the angular velocity, and the angular acceleration for the K reference periods; generating an error term for each of the K reference periods based on the ideal period and the corresponding actual period; and applying the error term to the corresponding actual period to compensate for disturbances in the crankshaft signal.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

Figure 1:
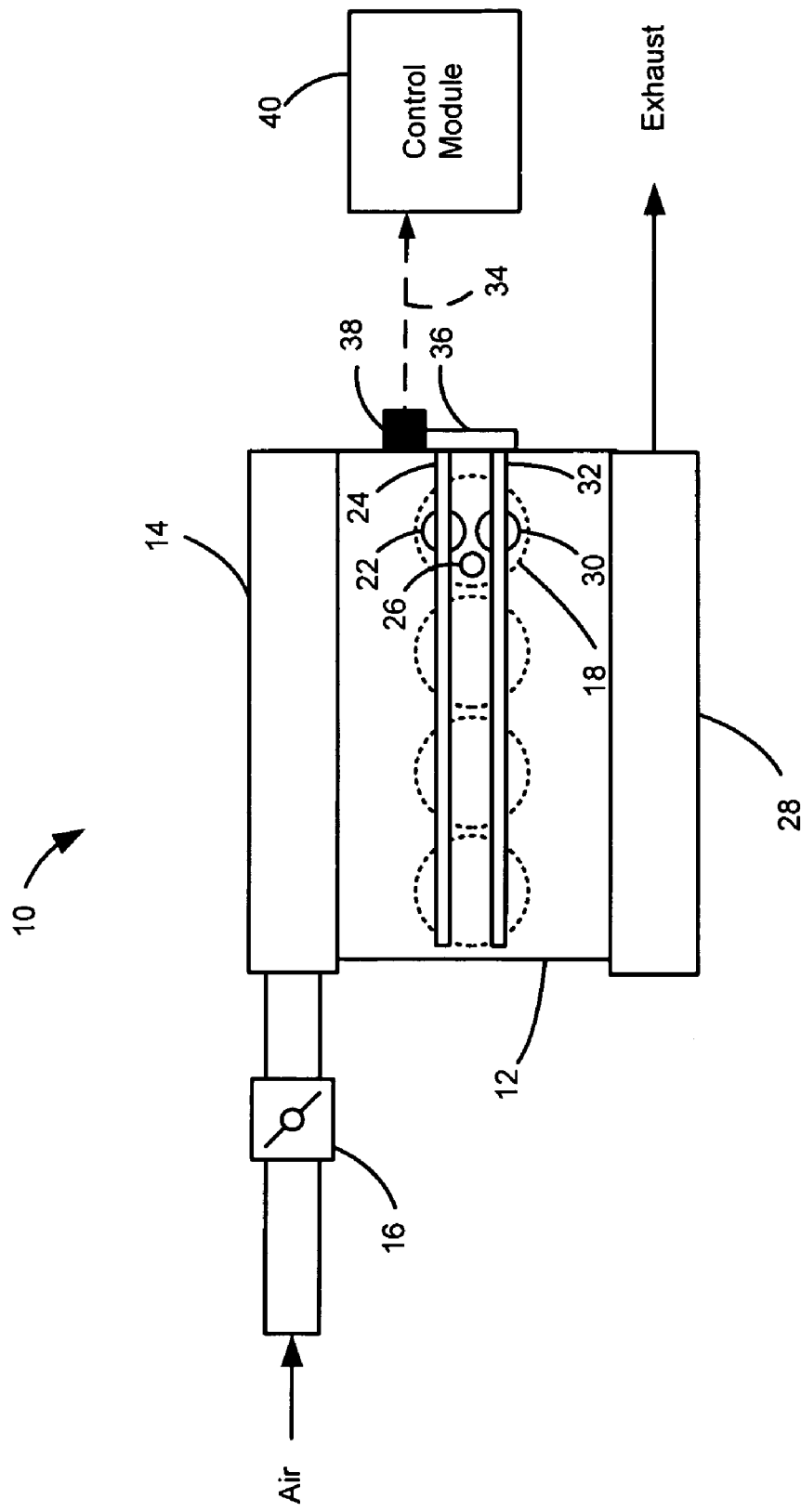
FIG. 1 is a functional block diagram of an engine system.

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that execute one or more software or firmware programs, a combinational logic circuit, and/or other suitable components that provide the described functionality.

Referring now to FIG. 1, an engine system 10 includes an engine 12 that combusts an air and fuel mixture to produce drive torque. Air is drawn into an intake manifold 14 through a throttle 16. The throttle 16 regulates mass air flow into the intake manifold 14. Air within the intake manifold 14 is distributed into cylinders 18. Although four cylinders 18 are illustrated, it is appreciated that the engine can have a plurality of cylinders including, but not limited to, 2, 3, 5, 6, 8, 10, 12 and 16 cylinders. It is also appreciated that the cylinders may be configured in an inline configuration (as shown) or v-shaped configuration.

A fuel injector (not shown) injects fuel that is combined with the air as it is drawn into the cylinder 18 through an intake port. An intake valve 22 selectively opens and closes to enable the air/fuel mixture to enter the cylinder 18. The intake valve position is regulated by an intake camshaft 24. A piston (not shown) compresses the air/fuel mixture within the cylinder 18. A spark plug 26 initiates combustion of the air/fuel mixture, driving the piston in the cylinder 18. The piston drives a crankshaft (not shown) to produce drive torque. Combustion exhaust within the cylinder 18 is forced out through an exhaust manifold 28 when an exhaust valve 30 is in an open position. The exhaust valve position is regulated by an exhaust camshaft 32. The exhaust is treated in an exhaust system. Although single intake and exhaust valves 22,30 are illustrated, it can be appreciated that the engine 12 can include multiple intake and exhaust valves 22,30 per cylinder 18.

The exhaust camshaft 32 and the intake camshaft 24 are coupled to the crankshaft (not shown) via sprockets and a timing chain (not shown). The engine system 10 outputs a crankshaft signal 34 to a control module 40. Based on the crankshaft signal, the control module determines an engine speed in revolutions per minute (RPM). The crankshaft signal 34 is generated by sensing the rotation of a wheel 36 coupled to the crankshaft. The wheel 36 includes a plurality of equidistantly spaced teeth. A wheel sensor 38 senses the teeth of the wheel and generates the crankshaft signal 34 in a periodic form. The control module 40 decodes the crankshaft signal 34 to a specific tooth number of the wheel 36. Crankshaft position is determined from the decoded tooth number of the wheel 36. Engine speed is determined from the amount of time it takes for one tooth to complete a rotation.

Figure 2:
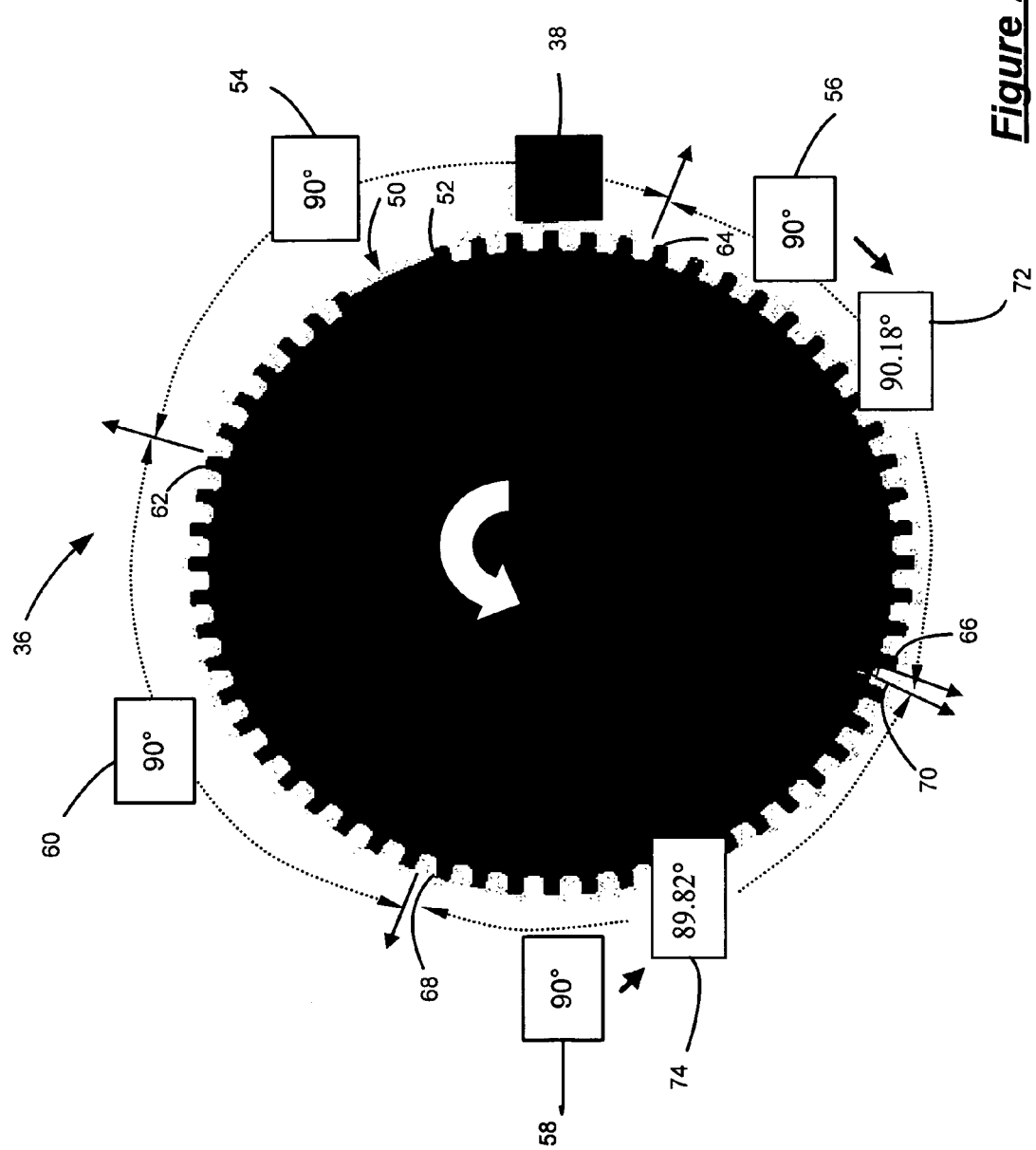
FIG. 2 is diagram illustrating a crankshaft wheel.

More specifically, an exemplary wheel applied to an eight cylinder v-shaped engine is shown in FIG. 2. Fifty-eight teeth are spaced equidistant along the outer circumference of the wheel 36. A gap 50 between two of the fifty-eight teeth serves as a rotational reference point for the sensor 38. More specifically, the gap 50 can be associated with a rotational position of the crankshaft relative to a position of a piston within a cylinder. For example, the low to high transition 52 within the gap 50 can indicate that a particular piston is at top dead center (TDC) within the respected cylinder.

Each tooth corresponds to six degrees of rotation of the crankshaft. Reference periods 54-60 are created for predefined reference angles (θ) with respect to three hundred and sixty degrees of the wheel 36. The number of reference periods 54-60 in a single rotation can be determined by dividing the number of cylinders in the engine by two. As shown in FIG. 2, four reference periods of ninety degrees are created for an eight cylinder engine. The reference periods are marked by reference teeth 62-68. An actual period ($t_{ACTUAL}$) corresponding to a specific reference period can be determined by monitoring the time at which the crankshaft and thus the wheel rotates through the reference angle ($\theta$).

In an ideal scenario, the crankshaft signal would experience no disturbances. Each period under ideal conditions ($t_{IDEAL}$) would be identical. Therefore, engine speed throughout the complete rotation would remain constant. However, disturbances in the crankshaft signal can cause faulty times. Various conditions can cause disturbances in the crankshaft signal. For example, a flawed tooth as shown at 70 typically causes a corresponding faulty period that deviates from an ideal period. The reference angles near the flawed tooth are adjusted as shown at 72 and 74 based on the flaw. Accordingly, engine speed computations based on the flawed times are inaccurate. By identifying and correcting the flawed times, a more accurate engine speed value can be achieved. It is appreciated that the crankshaft signal disturbance compensation method of the present disclosure is applicable to compensate the crankshaft signal for various types of disturbances.

The control module corrects a faulty period by learning the error ($t_{ERROR}$) between the ideal period ($t_{IDEAL}$) and the actual period ($t_{ACTUAL}$). As stated earlier, the ideal period ($t_{IDEAL}$) is a period over which the crankshaft would rotate a given angle ($\theta$) without experiencing any disturbances. The ideal period ($t_{IDEAL}$) is based on an average of actual periods ($t_{AVG\_ACTUAL}$), an average angular velocity ($v_{AVERAGE}$), and an average angular acceleration ($a_{AVERAGE}$). The error ($t_{ERROR}$) is then used to determine a correction factor ($t_{CORRECTION}$) which is then applied to the faulty period.

Figure 3:
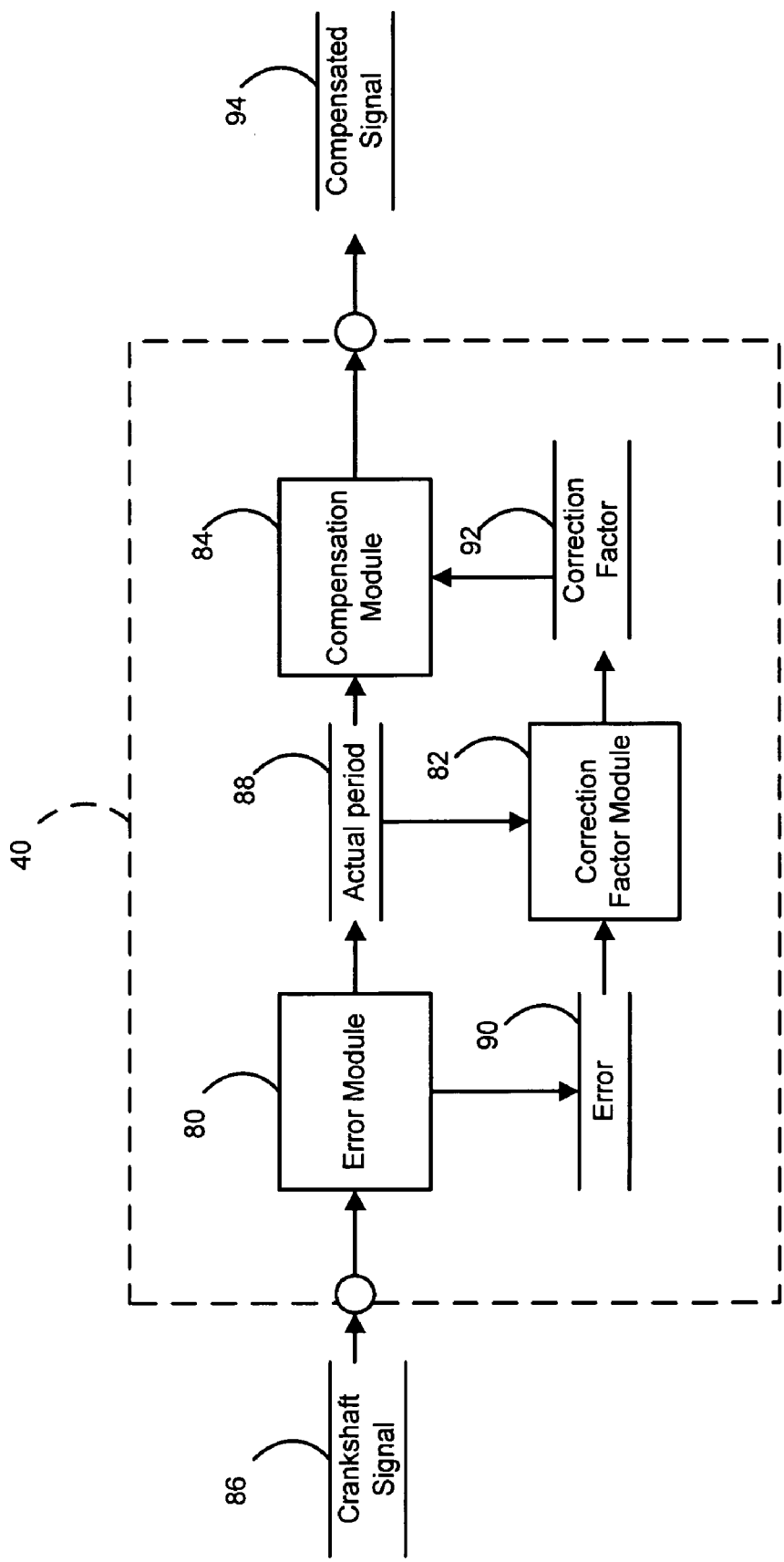
FIG. 3 is a dataflow diagram illustrating a crankshaft signal disturbance compensation system.

Referring now to FIG. 3, a dataflow diagram illustrates various embodiments of a crankshaft signal disturbance compensation system that may be embedded within the control module 40. Various embodiments of crankshaft signal disturbance compensation systems according to the present disclosure may include any number of sub-modules embedded within the control module 40. The sub-modules shown may be combined and/or further partitioned to similarly compensate for disturbances in the crankshaft signal.

In various embodiments, the control module 40 of FIG. 3 includes an error module 80, a correction factor module 82, and a compensation module 84. The error module 80 receives as input the crankshaft signal 34. From the crankshaft signal 34, the error module 80 computes one or more actual periods 88. From the actual periods 88, an ideal period is determined. For each actual period 88, the error module 80 outputs an error 90 based on a difference between the actual period 88 and the ideal period. The correction factor module 82 receives as input the errors 90 and the actual periods 88. Based on each error 90 a correction factor is determined for each actual period 88. The correction factor 92 can be stored in a datastore (not shown) of the control module 40. The compensation module 84 receives as input the correction factors 92 and the actual periods 88. For each actual period 88, the correction factor 92 is applied to the actual period 88 to compensate for the disturbance in the signal. A compensated crankshaft signal 94 is output by the compensation module 84 to be used by other sub-modules within the control module 40.

Figure 4:
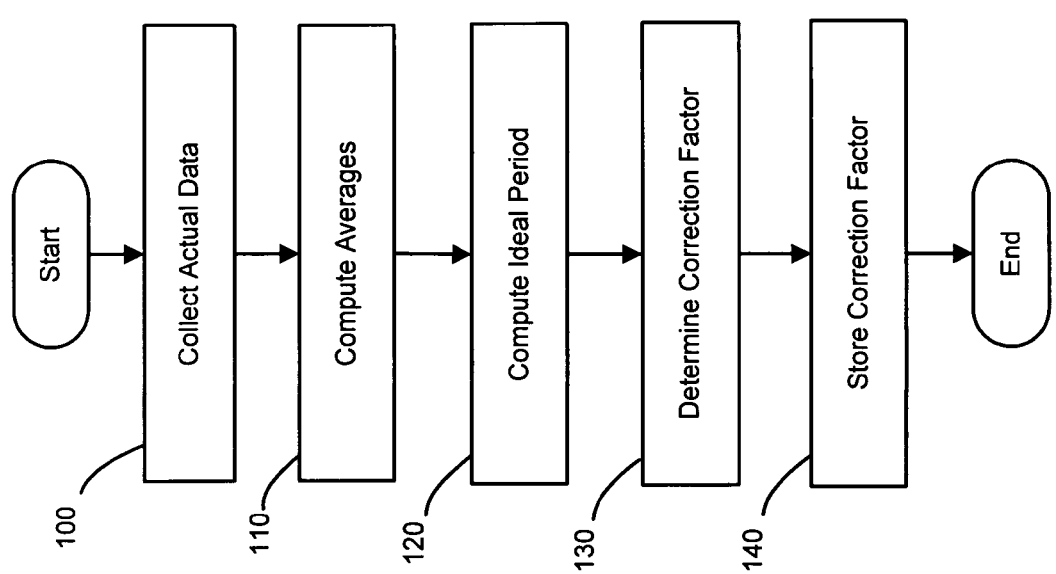
FIG. 4 is a flowchart illustrating a method of compensating for disturbances in a crankshaft signal received from the engine system.

Referring now to FIG. 4, a method of compensating for disturbances in the crank signal is shown. The method may be run at any time during engine operation. In various embodiments, the method may be specifically run after the engine speed is brought to a particular RPM and fuel cut off takes place. This removes fuel disturbances. In this case, the method is run while the engine is decelerating. In various embodiments, the method may be specifically run during engine steady state operation.

Figure 5:
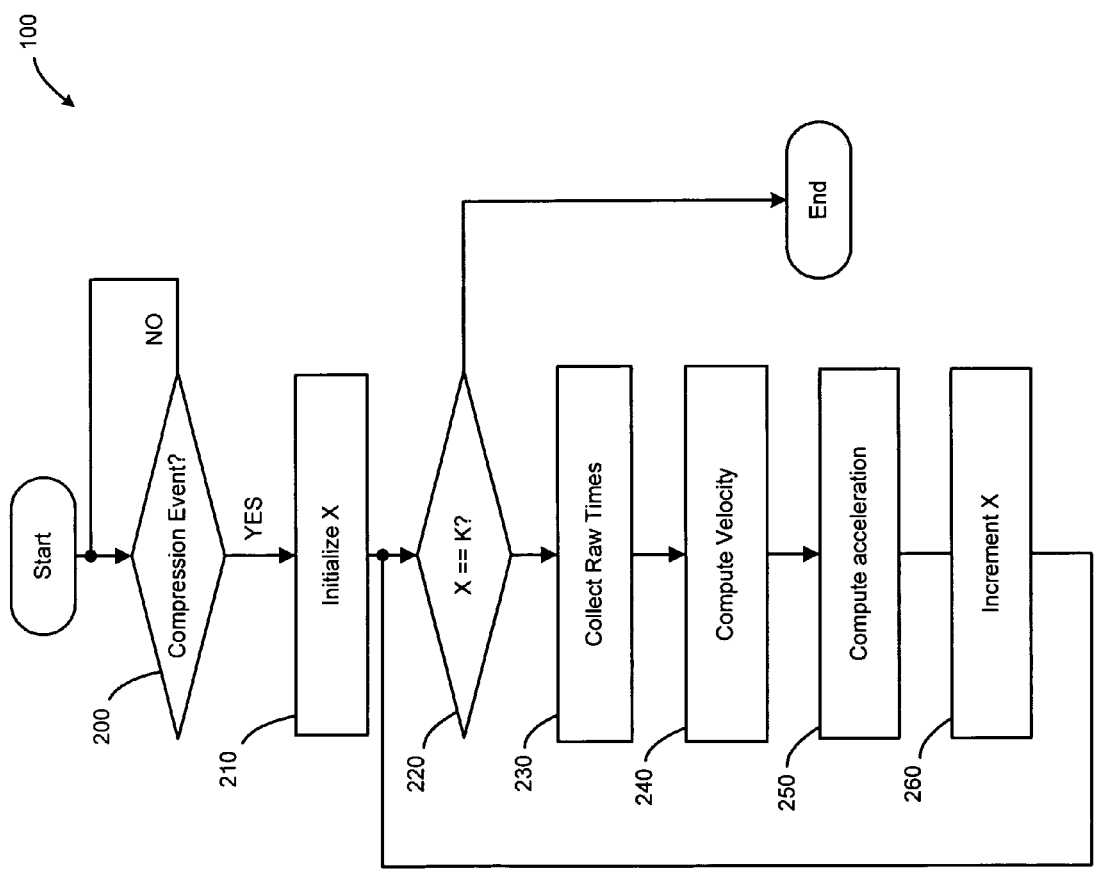
FIG. 5 is a flowchart illustrating a method of collecting actual data.

In FIG. 4, control collects actual data for each reference angle at 100. In various embodiments, as shown in FIG. 4, control collects the actual data for a predetermined number (k) of reference periods. The selected reference periods are centered around a compression event. The compression event includes two full rotations of the crankshaft. Thus, the predetermined number (k) for the example provided in FIG. 2 would be eight. In FIG. 5, control determines if the cylinder is starting a compression event at 200. If the compression event has not begun, control loops back and continues to monitor the cylinder events at 200. If the cylinder is starting the compression event at 200, control initializes an index variable (x) at 210. If the index variable (x) is not equal to the predetermined number of reference angles (k) at 220, control collects the actual period ($t_{ACTUAL}$) for the reference angle (x) at 230.

Control computes an actual angular velocity ($v_{ACTUAL}$) for the reference period (x) at 240 based on the following equation:

$$v_{ACTUAL}(x) = t_{ACTUAL}(x) - t_{ACTUAL}(x-1). \quad (1)$$

At 250, control computes an actual angular acceleration ($a_{ACTUAL}$) for the reference period (x) based on the following equation:

$$a_{ACTUAL}(x) = v_{ACTUAL}(x) - v_{ACTUAL}(x-1). \quad (2)$$

Control increments the index variable (x) at 260. Control loops back and continues to collect the actual data for each reference period (x) within the compression event.

Referring back to FIG. 4, control computes averages of the actual data at 110. An average period ($t_{AVG\_ACTUAL}$) of the number (k) of actual periods ($t_{ACTUAL}$) is computed based on the following equation:

$$t_{AVG\_ACTUAL} = \sum_{x=0}^{k-1} \frac{t_{ACTUAL}(x)}{k}. \quad (3)$$

An average angular velocity ($v_{AVERAGE}$) of the predetermined number (k) of reference periods of actual velocities ($v_{ACTUAL}$) can be computed according to the following equation:

$$v_{AVERAGE} = \sum_{x=0}^{k-1} \frac{v_{ACTUAL}(x)}{k}. \quad (4)$$

An average angular acceleration ($a_{AVERAGE}$) of the predetermined number (k) of reference periods of actual angular accelerations ($a_{ACTUAL}$) is computed according to the following equation:

$$a_{AVERAGE} = \sum_{x=0}^{k-1} \frac{a_{ACTUAL}(x)}{k}. \quad (5)$$

As can be appreciated, in various embodiments to minimize computational error due to noise in the signal, the average angular acceleration ($a_{AVERAGE}$) can be computed based on angular acceleration ($a_{ACTUAL}$). Where the angular acceleration ($a_{ACTUAL}$) is computed based on average velocity ($v_{AVERAGE}$).

At 120, control determines the ideal period ($t_{IDEAL}$) based on the angular velocity (v) and the angular acceleration (a) and provided the position equation:

$$x(t) = x(0) + vt + \frac{1}{2}at^2. \quad (6)$$

Substituting the above computed values into the position equation yields:

$$t(x) = t_{INITIAL} + v_{INITIAL} * x + \frac{1}{2} a_{AVERAGE} * x^2. \quad (7)$$

Where $t_{INITIAL}$ and $v_{INITIAL}$ are equal to the initial measured period $t_{ACTUAL}(0)$ and the initial computed angular velocity $v_{ACTUAL}(0)$ respectively. Note that the angular velocity and the angular acceleration can be assumed to be constant for each reference angle (x) of the total reference angles (k) to attain an ideal representation of engine behavior. Therefore the average angular velocity ($v_{AVERAGE}$) and/or the average angular acceleration ($a_{AVERAGE}$) can be used in equation (7). The average period ($t_{average}$) is determined by computing an average of successive samples of t shown as:

$$t_{average} = \sum_{x=0}^{k-1} \frac{t(x)}{k}. \quad (8)$$

To reduce computational throughput, the above referenced mathematical computation equations (7) and (8) are combined to give ($t_{IDEAL}$), and can be simplified as:

$$t_{IDEAL} = t_{AVERAGE} - A * v_{INITIAL} - B * a_{AVERAGE} \quad (9)$$

Where the coefficients (A) and (B) are predetermined values based on the predetermined number of reference periods (k). Fore example, the value of the coefficient (A) can be predetermined based on the following equation:

$$A = \sum_{x=0}^{k-1} \frac{x}{k}. \quad (10)$$

The value of the coefficient (B) can be predetermined based on the following equation:

$$B = \sum_{x=0}^{k-1} \frac{1/2 x^2}{k}. \quad (11)$$

This pre-computation can be implemented as an alternative to equations (7) and (8).

At 130, a correction factor ($t_{CORRECTION}$) is determined based on the error in each reference period (x). The error ($t_{ERROR}$) is defined as the difference between the ideal period ($t_{IDEAL}$) and the actual period ($t_{ACTUAL}$):

$$t_{ERROR}(x) = t_{IDEAL} - t_{ACTUAL}(x). \quad (12)$$

The correction factor for each reference period is determined by the following equation:

$$t_{CORRECTION}(x) = 1 + \frac{t_{ERROR}(x)}{t_{ACTUAL}(x)}. \quad (11)$$

At 140, control stores each correction factor ($t_{CORRECTION}$) in memory. In various embodiments, the correction factor ($t_{CORRECTION}$) is stored in a two dimensional lookup table with engine speed and cylinder ID as the indices. The stored correction factors can be later retrieved to correct the faulty period by multiplying the faulty period by the correction factor.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. An engine system that compensates for disturbances in a crankshaft signal, comprising:
   an error module that computes an error between an ideal period and an actual period of a crankshaft signal;
   a correction factor module that determines a correction factor based on the error; and
   a compensation module that applies the correction factor to the actual period of the crankshaft signal,
   wherein the error module computes the ideal period from a position equation,
   wherein the error module determines an average period and an average angular acceleration for K number of reference periods, and
   wherein the ideal period is computed from an initial angular velocity, the average period, and the average angular acceleration.

2. The system of claim 1 wherein the correction factor module determines the correction factor ($t_{CORRECTION}$) based on the error ($t_{ERROR}$), the actual period ($t_{ACTUAL}$), and the following equation:

$$t_{CORRECTION} = 1 + \frac{t_{ERROR}}{t_{ACTUAL}}.$$

3. The system of claim 1 wherein the correction factor module stores the correction factor in a lookup table accessed by engine speed and cylinder identification.

4. The system of claim 1 wherein the error module computes the ideal period ($t_{IDEAL}$) based on two coefficients (A and B), the average period ($t_{AVERAGE}$), an the initial angular velocity ($v_{INITIAL}$), and an the average angular acceleration ($a_{AVERAGE}$) and the following equation:

$$t_{IDEAL} = t_{AVERAGE} - A * v_{INITIAL} - B * a_{AVERAGE}.$$

5. The system of claim 4 wherein the coefficient A is predetermined based on a the number of reference periods K and the following equation:

$$A = \sum_{x=0}^{k-1} \frac{x}{k}.$$

6. The system of claim 4 wherein the coefficient B is predetermined based on a the number of reference periods K and the following equation:

$$B = \sum_{x=0}^{k-1} \frac{1/2x^2}{k}.$$

7. A method of compensating for disturbances in a crankshaft signal, comprising:
   determining an actual period, an angular velocity, and an angular acceleration for K reference periods from a crankshaft position signal;
   computing an ideal period of rotation based on the actual period, the angular velocity, and the angular acceleration for the K reference periods;
   generating an error term for each of the K reference periods based on the ideal period and the corresponding actual period;
   computing a correction factor for each of the K reference periods based on the error term; and
   applying the correction factor based on the error term of the corresponding actual period to compensate for disturbances in the crankshaft signal.

8. The method of claim 7 further comprising:
   computing an average period and an average angular acceleration for the K reference periods; and
   computing the ideal period of rotation based on the average period, an angular velocity of an initial reference period of the K reference periods, the average angular acceleration, and two predetermined coefficients (A and B).

9. The method of claim 8 wherein the coefficient (A) is predetermined based on the number (K) of predetermined reference periods and the following equation:

$$A = \sum_{x=0}^{k-1} \frac{x}{k}.$$

10. The method of claim 8 wherein the coefficient (B) is predetermined based on the number (K) of predetermined reference periods and the following equation:

$$B = \sum_{x=0}^{k-1} \frac{1/2x^2}{k}.$$

11. The method of claim 7 further comprising generating the error term ($t_{ERROR}$) for each (x) of the K reference periods based on the ideal period ($t_{IDEAL}$), the actual period ($t_{ACTUAL}$), and the following equation:

$$t_{ERROR}(x) = t_{IDEAL} - t_{ACTUAL}(x).$$

12. The method of claim 7 further comprising computing the correction factor based on the error term ($t_{ERROR}$), the actual period ($t_{ACTUAL}$), and the following equation:

$$t_{CORRECTION}(x) = 1 + \frac{t_{ERROR}(x)}{t_{ACTUAL}(x)}.$$

13. The method of claim 7 further comprising storing the correction factor in a lookup table accessed by engine speed and cylinder identification.

14. The method of claim 7 further comprising computing the ideal period of rotation based on an average of computed periods wherein a period is computed for each of the K reference periods based on an actual period of an initial reference period of the K reference periods, an angular velocity of an initial reference period of the K reference periods, and an average angular acceleration.

15. The method of claim 7 further comprising generating a crankshaft signal from a sensor sensing a rotational position of a wheel coupled to a crankshaft.

* * * * *

UNITED STATES PATENT AND TRADEMARK OFFICE
CERTIFICATE OF CORRECTION

PATENT NO. : 7,607,415 B2  Page 1 of 1
APPLICATION NO. : 11/542672
DATED : October 27, 2009
INVENTOR(S) : Mathews et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 329 days.

Signed and Sealed this

Twelfth Day of October, 2010

David J. Kappos
*Director of the United States Patent and Trademark Office*